US009343031B2

(12) United States Patent
Yu et al.

(10) Patent No.: US 9,343,031 B2
(45) Date of Patent: May 17, 2016

(54) ELECTRONIC DEVICE WITH COMPACT GATE DRIVER CIRCUITRY

(71) Applicant: Apple Inc., Cupertino, CA (US)

(72) Inventors: Cheng-Ho Yu, Cupertino, CA (US); Abbas Jamshidi Roudbari, Cupertino, CA (US); Shih-Chang Chang, Cupertino, CA (US); Ting-Kuo Chang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 581 days.

(21) Appl. No.: 13/687,713

(22) Filed: Nov. 28, 2012

(65) Prior Publication Data

US 2014/0146026 A1 May 29, 2014

(51) Int. Cl.
*G06F 3/038* (2013.01)
*G09G 3/36* (2006.01)

(52) U.S. Cl.
CPC .................................... *G09G 3/3677* (2013.01)

(58) Field of Classification Search
CPC ......... G06F 3/038; G09G 5/20; G09G 3/3677
See application file for complete search history.

(56) References Cited

U.S. PATENT DOCUMENTS

| | | | | |
|---|---|---|---|---|
| 5,963,188 | A | 10/1999 | Kim | |
| 6,404,237 | B1 * | 6/2002 | Mathew et al. | 326/113 |
| 7,932,887 | B2 | 4/2011 | Kim et al. | |
| 8,107,586 | B2 | 1/2012 | Shin et al. | |
| 8,264,426 | B2 * | 9/2012 | Chung | 345/76 |
| 2005/0018807 | A1 * | 1/2005 | Han et al. | 377/69 |
| 2006/0071896 | A1 | 4/2006 | Nakata et al. | |
| 2009/0160842 | A1 * | 6/2009 | Yamashita | 345/212 |
| 2012/0076256 | A1 * | 3/2012 | Yonemaru et al. | 377/79 |

* cited by examiner

*Primary Examiner* — Kent Chang
*Assistant Examiner* — Mark Edwards
(74) *Attorney, Agent, or Firm* — Treyz Law Group, P.C.; Zachary D. Hadd; Jason Tsai

(57) ABSTRACT

An electronic device display may have an array of display pixels that are controlled using a grid of data lines and gate lines. The display may include compact gate driver circuits that perform gate driver operations to drive corresponding gate lines. Each compact gate driver circuit may include a first driver stage and a second driver stage. The first driver stage may receive a start pulse signal and produce a control signal. The control signal may be stored by a capacitor to identify a control state of the gate driver circuit. The second driver stage may receive the control signal, a clock signal, and a corresponding inverted clock signal and drive the corresponding gate line based on the received signals. The second driver stage may include pass transistor circuitry that passes the clock signal to the corresponding gate line and may include short circuit protection circuitry.

22 Claims, 15 Drawing Sheets

ELECTRONIC DEVICE WITH COMPACT GATE DRIVER CIRCUITRY

BACKGROUND

This relates generally to electronic devices and, more particularly, to displays for electronic devices.

Electronic devices such as computers and cellular telephones are generally provided with displays. Displays such as liquid crystal displays contain a thin layer of liquid crystal material. Color liquid crystal displays include color filter layers. The layer of liquid crystal material in this type of display is interposed between the color filter layer and a thin-film transistor layer. Polarizer layers may be placed above and below the color filter layer, liquid crystal material, and thin-film transistor layer.

When it is desired to display an image for a user, display driver circuitry applies signals to a grid of data lines and gate lines within the thin-film transistor layer. These signals adjust electric fields associated with an array of pixels on the thin-film transistor layer. The electric field pattern that is produced controls the liquid crystal material and creates a visible image on the display.

Conventional display driver circuitry includes circuitry such as flip-flops and registers implemented using transistors that occupy valuable area on the display. For example, each gate line to be driven typically requires 10-14 or more transistors that serve to drive the gate line. In displays that include multiple gate lines, the display driver circuitry for each of the gate lines combine to occupy a non-trivial amount of area on the display.

It would therefore be desirable to be able to provide improved electronic device displays.

SUMMARY

Electronic devices may be provided with displays such as liquid crystal displays. A display may have an array of display pixels. The display pixels may be controlled using a grid of data lines and gate lines. Each pixel may receive display data on a data line and may have a thin-film transistor that is controlled by a gate line signal on a gate line. The thin-film transistors may be controlled to apply electric fields to a layer of liquid crystal material.

A display may include compact gate driver circuits that perform gate driver operations to drive corresponding gate lines. The gate driver circuits may be located at the periphery of the display. Each compact gate driver circuit may include a first driver stage and a second driver stage. The first driver stage may receive a start pulse signal and produce a control signal for the second driver stage. The control signal may be stored by a capacitor to identify the current control state of the gate driver circuit. The start pulse received by a gate driver circuit may be produced by central driver circuitry or may be a gate line signal produced by a previous gate driver circuit.

The second driver stage of each compact gate driver circuit may receive the control signal from the capacitor, a periodic signal, and a corresponding inverted periodic signal and drive the corresponding gate line based on the received signals. The periodic signal may be a clock signal for the corresponding gate line. The second driver stage may include pass transistor circuitry that passes the clock signal to the corresponding gate line. The pass transistor circuitry may be coupled to short circuit protection circuitry that helps to prevent formation of short circuit paths. If desired, charge boosting operations may be performed by the first driver stage to help ensure that the second driver stage is disabled when not performing gate driver operations.

Further features of the invention, its nature and various advantages will be more apparent from the accompanying drawings and the following detailed description of the preferred embodiments.

DETAILED DESCRIPTION

Figure 1:
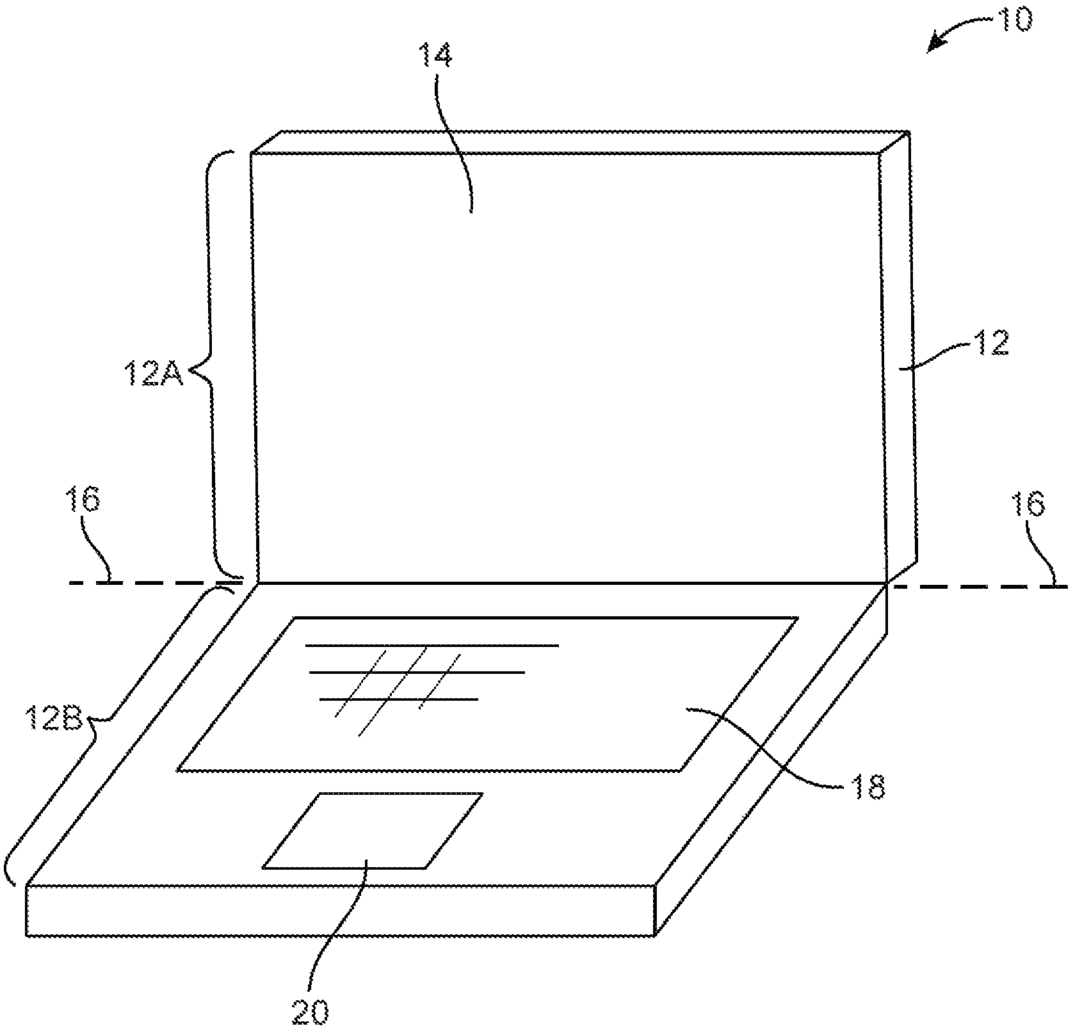
FIG. 1 is a diagram of an illustrative electronic device with a display such as a portable computer in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may be a touch screen that incorporates capacitive touch electrodes or other touch sensor components or may be a display that is not touch sensitive. Display 14 may include image pixels formed from liquid crystal display (LCD) components or other suitable display pixel structures. Arrangements in which display 18 is formed using liquid crystal display pixels are sometimes described herein as an example. This is, however, merely illustrative. Any suitable type of display technology may be used in forming display 14 if desired.

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Figure 2:
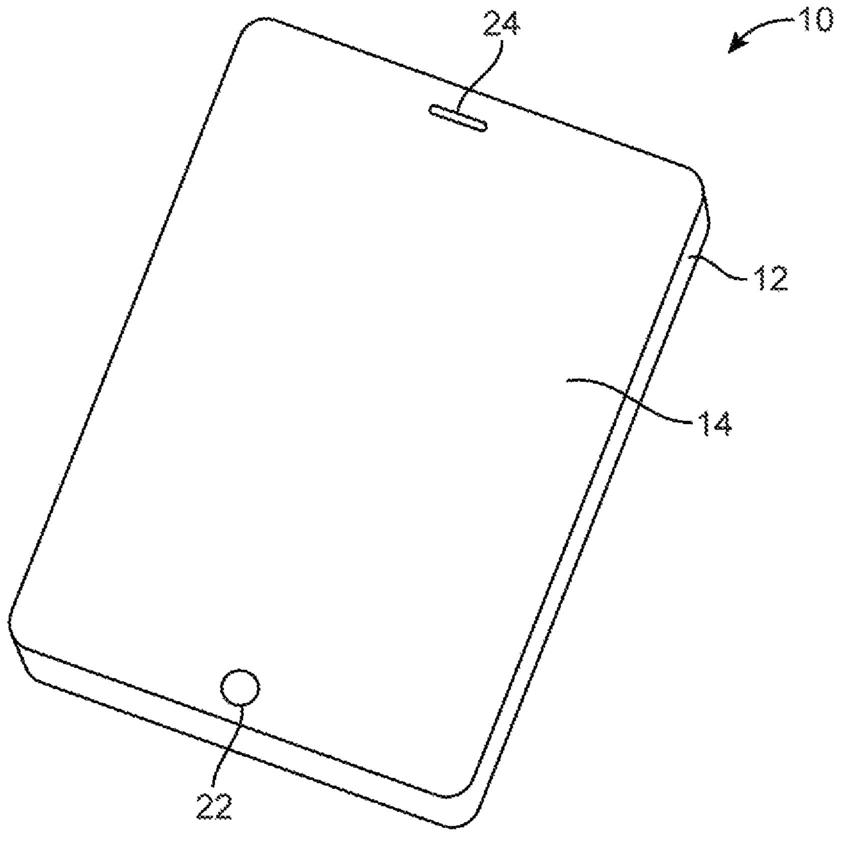
FIG. 2 is a diagram of an illustrative electronic device with a display such as a cellular telephone or other handheld device in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a display such as display 14 mounted on the front of housing 12. Display 14 may be substantially filled with active display pixels or may have an inactive portion and an inactive portion. Display 14 may have openings (e.g., openings in the inactive or active portions of display 14) such as an opening to accommodate button 22 and an opening to accommodate speaker port 24.

Figure 3:
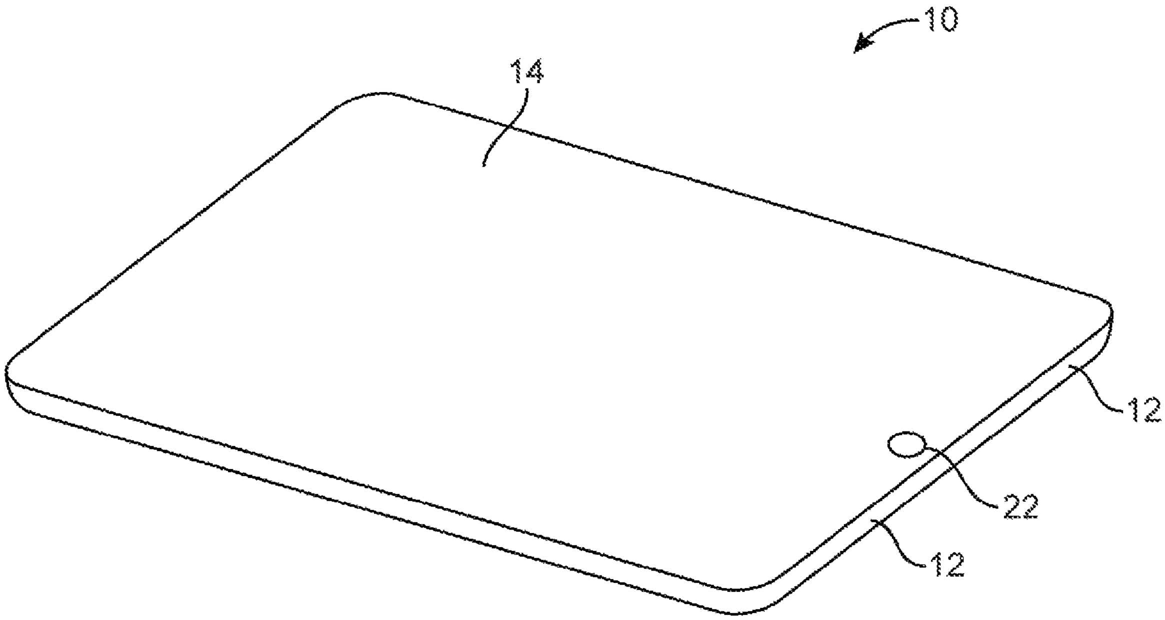
FIG. 3 is a diagram of an illustrative electronic device with a display such as a tablet computer in accordance with an embodiment of the present invention.

FIG. 3 is a perspective view of electronic device 10 in a configuration in which electronic device 10 has been implemented in the form of a tablet computer. As shown in FIG. 3, display 14 may be mounted on the upper (front) surface of housing 12. An opening may be formed in display 14 to accommodate button 22.

Figure 4:
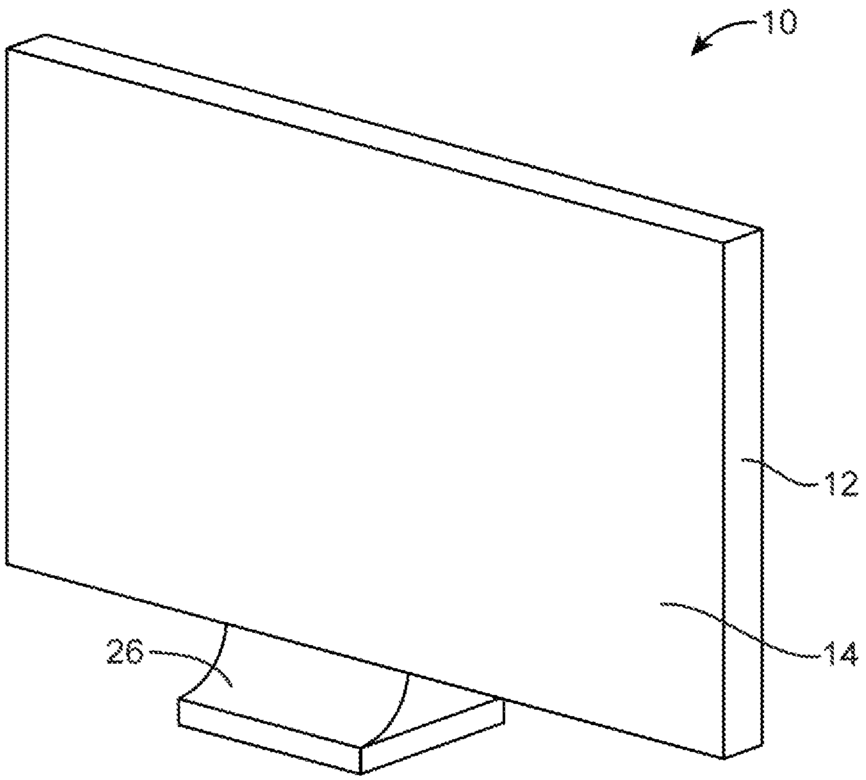
FIG. 4 is a diagram of an illustrative electronic device with a display such as a computer monitor with a built-in computer in accordance with an embodiment of the present invention.

FIG. 4 is a perspective view of electronic device 10 in a configuration in which electronic device 10 has been implemented in the form of a computer integrated into a computer monitor. As shown in FIG. 4, display 14 may be mounted on the front surface of housing 12. Stand 26 may be used to support housing 12.

Other configurations may be used for electronic device 10 having a display if desired. The examples of FIGS. 1, 2, 3, and 4 are merely illustrative.

Figure 5:
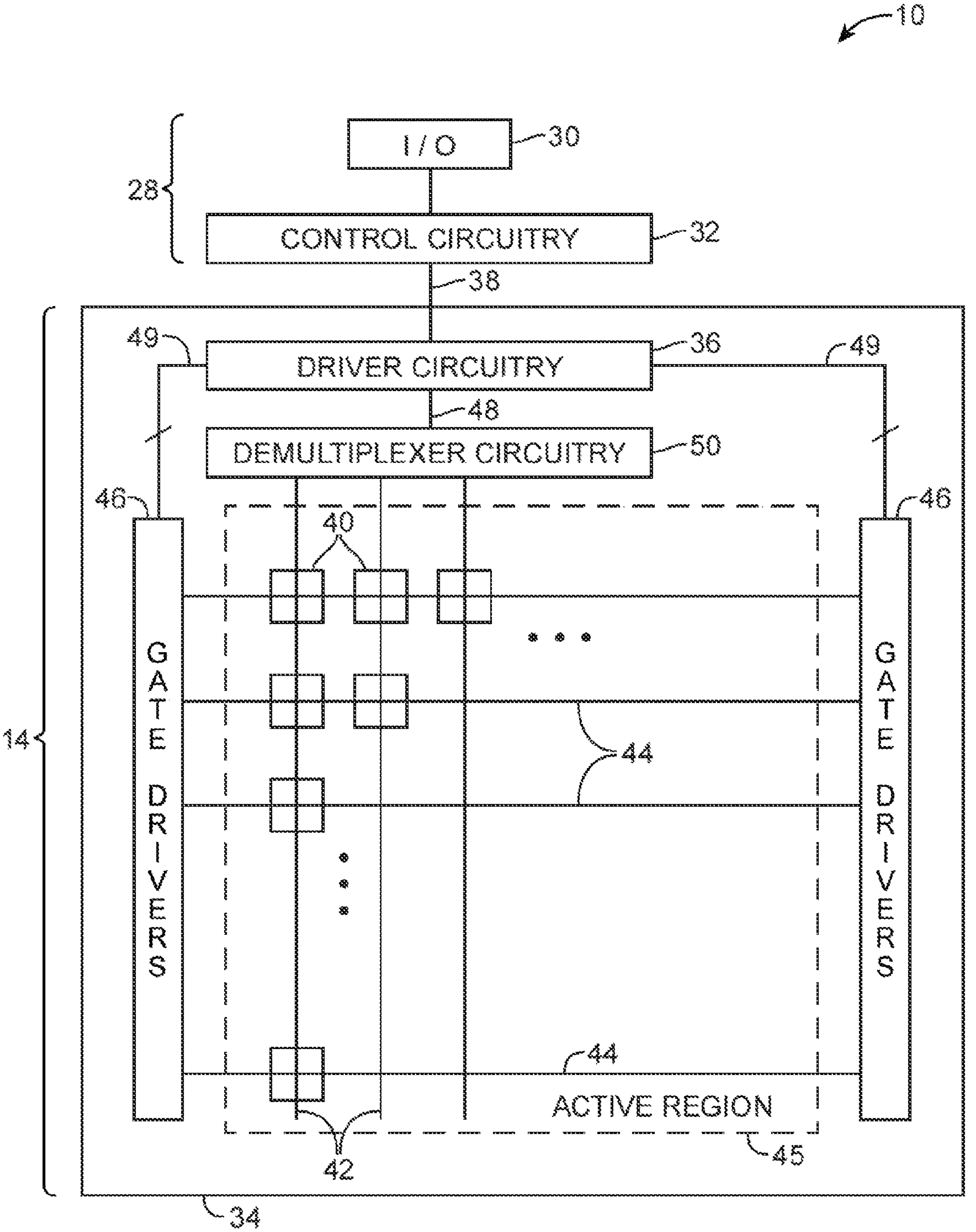
FIG. 5 is a circuit diagram showing circuitry that may be used in operating an electronic device with a display in accordance with an embodiment of the present invention.

A diagram showing circuitry of the type that may be used in device 10 is shown in FIG. 5. As shown in FIG. 5, display 14 may be coupled to device components 28 such as input-output circuitry 30 and control circuitry 32. Input-output circuitry 30 may include components for receiving device input. For example, input-output circuitry 30 may include a microphone for receiving audio input, a keyboard, keypad, or other buttons or switches for receiving input (e.g., key press input or button press input from a user), sensors for gathering input such as an accelerometer, a compass, a light sensor, a proximity sensor, touch sensor (e.g., touch sensors associated with display 14 or separate touch sensors), or other input devices. Input-output circuitry 30 may also include components for supplying output. Output circuitry may include components such as speakers, light-emitting diodes or other light-emitting devices for producing light output, vibrators, and other components for supplying output. Input-output ports in circuitry 30 may be used for receiving analog and/or digital input signal and may be used for outputting analog and/or digital output signals. Examples of input-output ports that may be used in circuitry 30 include audio ports, digital data ports, ports associated with 30-pin connectors, 9-pin connectors, reversible connectors, and ports associated with Universal Serial Bus connectors and other digital data connectors.

Control circuitry 32 may be used in controlling the operation of device 10. Control circuitry 32 may include storage circuits such as volatile and non-volatile memory circuits, solid state drives, hard drives, and other memory and storage circuitry. Control circuitry 32 may also include processing circuitry such as processing circuitry in a microprocessor or other processor. One or more integrated circuits may be used in implementing control circuitry 32. Examples of integrated circuits that may be included in control circuitry 32 include microprocessors, digital signal processors, power management units, baseband processors, microcontrollers, application-specific integrated circuits, circuits for handling audio and/or visual information, and other control circuitry.

Control circuitry 32 may be used in running software for device 10. For example, control circuitry 32 may be configured to execute code in connection with the displaying of images on display 14 (e.g., text, pictures, video, etc.).

Display 14 may include a pixel array such as pixel array 34. Pixel array 34 may be controlled using control signals produced by display driver circuitry such as display driver circuitry 36. Display driver circuitry 36 may be implemented using one or more integrated circuits (ICs) and may sometimes be referred to as a driver IC, display driver integrated circuit, or display driver. Display driver integrated circuit 36 may be mounted on an edge of a thin-film transistor substrate layer in display 14 (as an example). The thin-film transistor substrate layer may sometimes be referred to as a thin-film transistor (TFT) layer.

During operation of device 10, control circuitry 32 may provide data to display driver 36. For example, control circuitry 32 may use a path such as path 38 to supply display driver 36 with digital data corresponding to text, graphics, video, or other images to be displayed on display 14. Display driver 36 may convert the data that is received on path 38 into signals for controlling the pixels of pixel array 34. Display driver 36 may produce control signals such as start pulse signals and provide the control signals to gate drivers 46 via paths 49.

Pixel array 34 may contain rows and columns of display pixels 40 that collectively form an active region 45. The circuitry of pixel array 34 may be controlled using signals such as data line signals on data lines 42 and gate line signals on gate lines 44.

Pixels 40 in pixel array 34 may contain thin-film transistor circuitry (e.g., polysilicon transistor circuitry or amorphous silicon transistor circuitry) and associated structures for producing electric fields across liquid crystal material in display 14. The thin-film transistor structures that are used in forming pixels 40 may be located on a substrate (sometimes referred to as a thin-film transistor layer or thin-film transistor substrate). The thin-film transistor (TFT) layer may be formed from a planar glass substrate, a plastic substrate, or a sheet of other suitable substrate materials.

Gate driver circuitry 46 may be used to generate gate signals on gate lines 44. Circuits such as gate driver circuitry 46 may be formed from thin-film transistors on the thin-film transistor layer. Gate driver circuitry 46 may be located on both the left and right sides of pixel array 34 (as shown in FIG. 5) or may be located on only one side of pixel array 34.

The data line signals in pixel array 34 carry analog image data (e.g., voltages with magnitudes representing pixel brightness levels). During the process of displaying images on display 14, display driver circuitry 36 may receive digital data from control circuitry 32 via path 38 and may produce corresponding analog data on paths 48. The analog data signals on paths 48 may be demultiplexed by demultiplexer circuitry 50 in accordance with control signals provided by driver circuitry 36 on paths 48. This demultiplexing process produces corresponding color-coded analog data line signals on data lines 42 (e.g., data signals for a red channel, data signals for a green channel, and data signals for a blue channel).

The data line signals on data lines 42 may be provided to the columns of display pixels 40 in pixel array 34. Gate line signals may be provided to the rows of pixels 40 in pixel array 34 by gate driver circuitry 46.

The circuitry of display 14 such as demultiplexer circuitry 50 and gate driver circuitry 46 and the circuitry of pixels 40 may be formed from conductive structures (e.g., metal lines and/or structures formed from transparent conductive materials such as indium tin oxide) and may include transistors that are fabricated on the thin-film transistor substrate layer of display 14. The thin-film transistors may be, for example, polysilicon thin-film transistors or amorphous silicon transistors.

Figure 6:
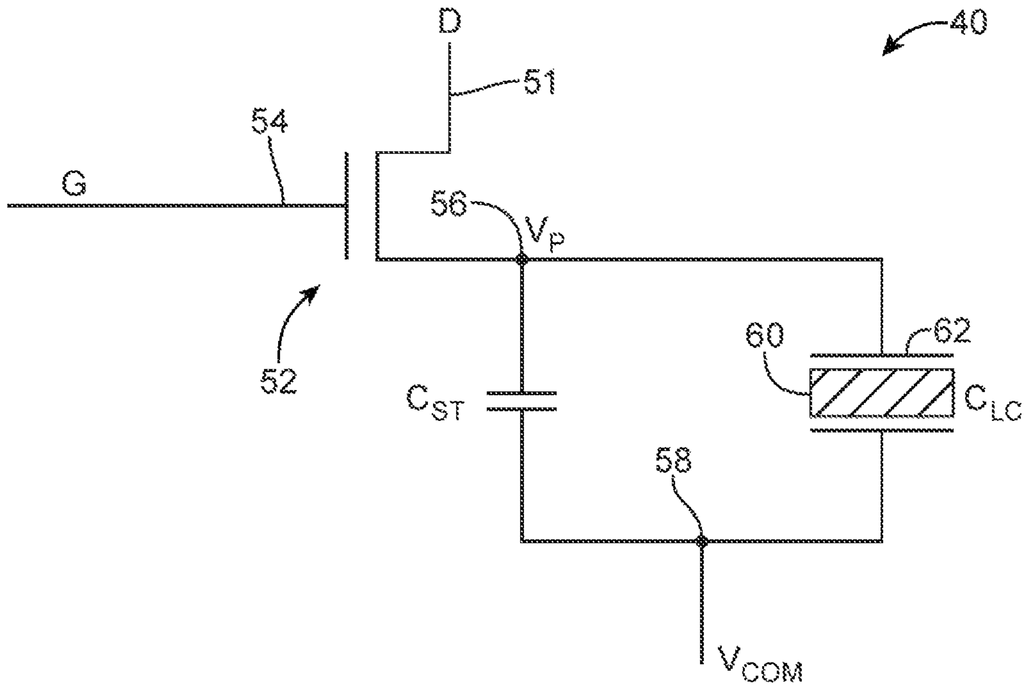
FIG. 6 is a circuit diagram of an illustrative display pixel in accordance with an embodiment of the present invention.

FIG. 6 is a circuit diagram of an illustrative display pixel in pixel array 34. Pixels such as pixel 40 of FIG. 6 may be located at the intersection of each gate line 44 and data line 42 in array 34.

A data signal D may be supplied to terminal 51 from one of data lines 42 (FIG. 5). Thin-film transistor 52 (e.g., a thin-film polysilicon transistor or an amorphous silicon transistor) may have a gate terminal such as gate 54 that receives gate line signal G from gate driver circuitry 46 (FIG. 5). When signal G is asserted, transistor 52 will be turned on and signal D will be passed to node 56 as voltage Vp. Data for display 14 may be displayed in frames. Following assertion of signal G in one frame, signal G may be deasserted. Signal G may then be asserted to turn on transistor 52 and capture a new value of Vp in a subsequent display frame.

Pixel 40 may have a signal storage element such as capacitor Cst or other charge storage element. Storage capacitor Cst may be used to store signal Vp between frames (i.e., in the period of time between the assertion of successive signals G).

Display 14 may have a common electrode coupled to node 58. The common electrode (which is sometimes referred to as the Vcom electrode) may be used to distribute a common electrode voltage such as common electrode voltage Vcom to nodes such as node 58 in each pixel 40 of array 24. Capacitor Cst may be coupled between nodes 56 and 58. A parallel capacitance Clc arises across nodes 56 and 58 due to electrode structures in pixel 40 that are used in controlling the electric field through the liquid crystal material of the pixel (liquid crystal material 60). As shown in FIG. 6, electrode structures 62 may be coupled to node 56. Capacitance Clc is associated with the capacitance between electrode structures 62 and common electrode Vcom at node 58. During operation, electrode structures 62 may be used to apply a controlled electric field (i.e., a field having a magnitude proportional to Vp-Vcom) across a pixel-sized portion of liquid crystal material 60 in pixel 40. Due to the presence of storage capacitor Cst, the value of Vp (and therefore the associated electric field across liquid crystal material 60) may be maintained across nodes 56 and 58 for the duration of the frame.

The electric field that is produced across liquid crystal material 60 causes a change in the orientations of the liquid crystals in liquid crystal material 60. This changes the polarization of light passing through liquid crystal material 60. The change in polarization may be used in controlling the amount of light that is transmitted through each pixel 40 in array 34.

Figure 7:
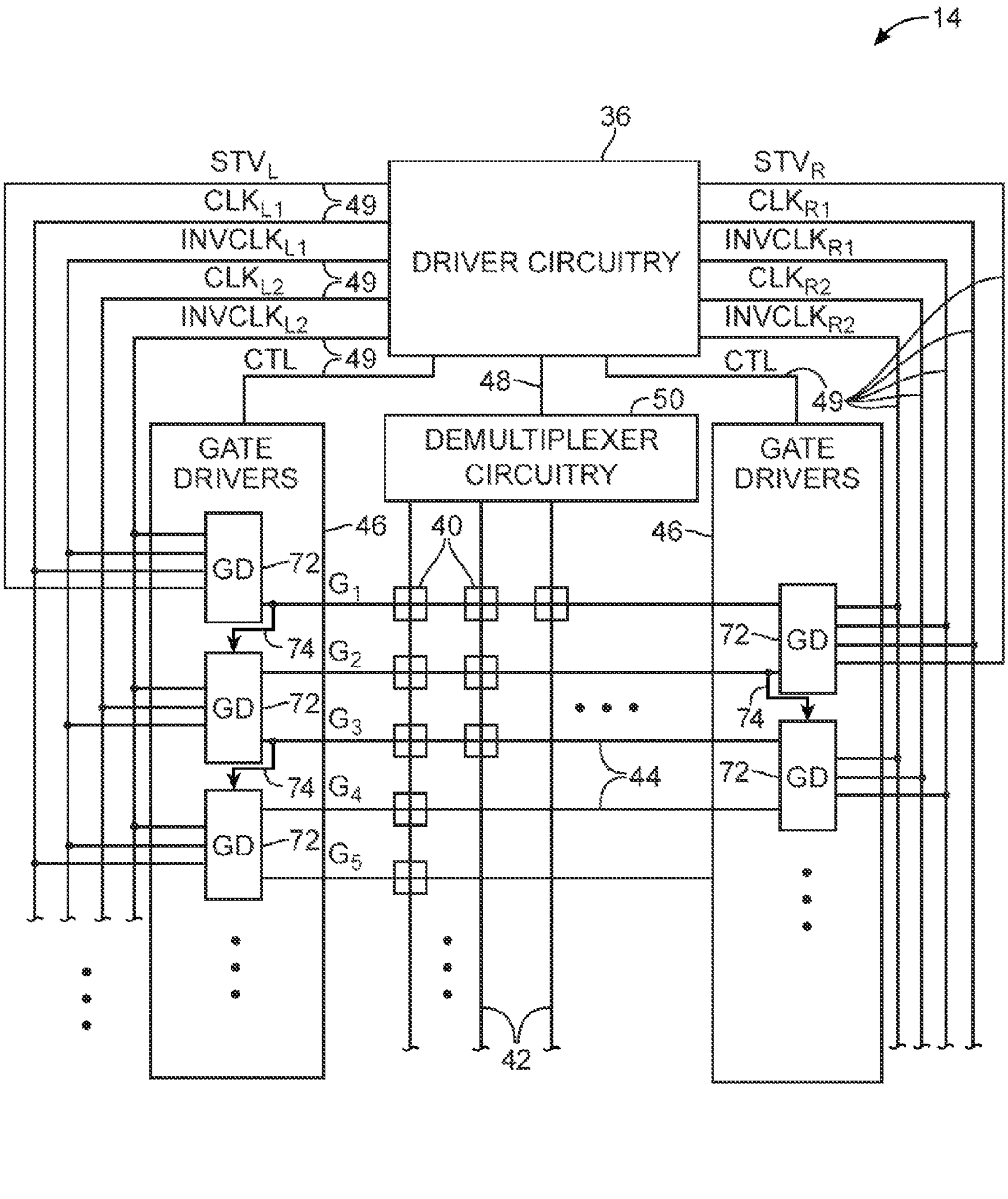
FIG. 7 is a diagram of an illustrative display including compact gate drivers that may be used to drive corresponding gate lines in accordance with an embodiment of the present invention.

Driver circuitry on display 14 includes components such as transistors and other circuitry. Area on display 14 is typically reserved for implementing driver circuitry on display 14. For example, gate drivers 46 may occupy area at the periphery of active region 45 as shown in FIG. 5. It may be desirable to reduce the area occupied by gate drivers 46 so that inactive regions (e.g., peripheral regions of display 14 that surround active region 45 and do not include any pixels 40) are minimized. FIG. 7 is a diagram of an illustrative display 14 with compact gate driver circuitry 46.

As shown in FIG. 7, gate driver circuitry 46 may be located at left and right sides of display 14. Each gate driver circuitry 46 may include gate driver circuits 72 that drive corresponding gate lines 44 with gate line signals. Gate lines 44 may be interleaved between left and right gate drivers 46 so that each gate driver circuitry 46 serves to provide about half of the gate line signals. In the example of FIG. 7, gate drivers 72 at the left side of display 14 may drive gate lines G1, G3, and G5 (e.g., odd numbered gate lines), whereas gate drivers 72 at the right side of display 14 may drive gate lines G2 and G4 (e.g., even numbered gate lines).

Driver circuitry 36 may provide control and clock signals to gate drivers 46 over paths 49. Start pulse signals STVL and STVR may be provided at the start of each display frame to gate drivers 46 at the left and right sides of display 14. The assertion of start pulse signal STVL at the start of a display frame may direct the first gate driver 72 at the left side of display 14 (e.g., the gate driver that drives gate line G1) to begin gate driving operations. The assertion of start pulse signal STVR may similarly initialize gate driving operations for gate driver circuits 72 on the right side of display 14. Paths 74 may convey gate line signals between gate drivers 72 so that each gate line signal serves to initialize display operations at a subsequent gate driver 72. For example, the gate line signal on gate line G1 produced by a first gate driver 72 may be provided to a subsequent gate driver 72 to initialize display operations for driving gate line G3.

If desired, additional control signals such as signal CTL may be provided driver circuitry 36 to gate drivers 46 over paths 49. The additional control signals may be used to configure circuitry such as switches in gate driver circuitry 46 (as an example).

During display operations, clock signals provided by driver circuitry 36 may be used to drive gate line signals. Clock signals CLKL1 and CLKL2 may control gate drivers 72 at the left side of display 14, whereas clock signals CLKR1 and CLKR2 may control gate drivers at the right side of display 14. Gate drivers 72 may also receive inverted versions of the clock signals (e.g., signal CLKL1 may be inverted to produce corresponding inverted clock signal INVCLKL1, CLKL2 may be inverted to produce INVCLKL2, CLKR1 may be inverted to produce INVCLKR1, and CLKR2 may be inverted to produce INVCLKR2). In the example of FIG. 7, the inverted clock signals may be produced by driver circuitry 36 and provided to gate drivers 72 via paths 49.

Figure 8:
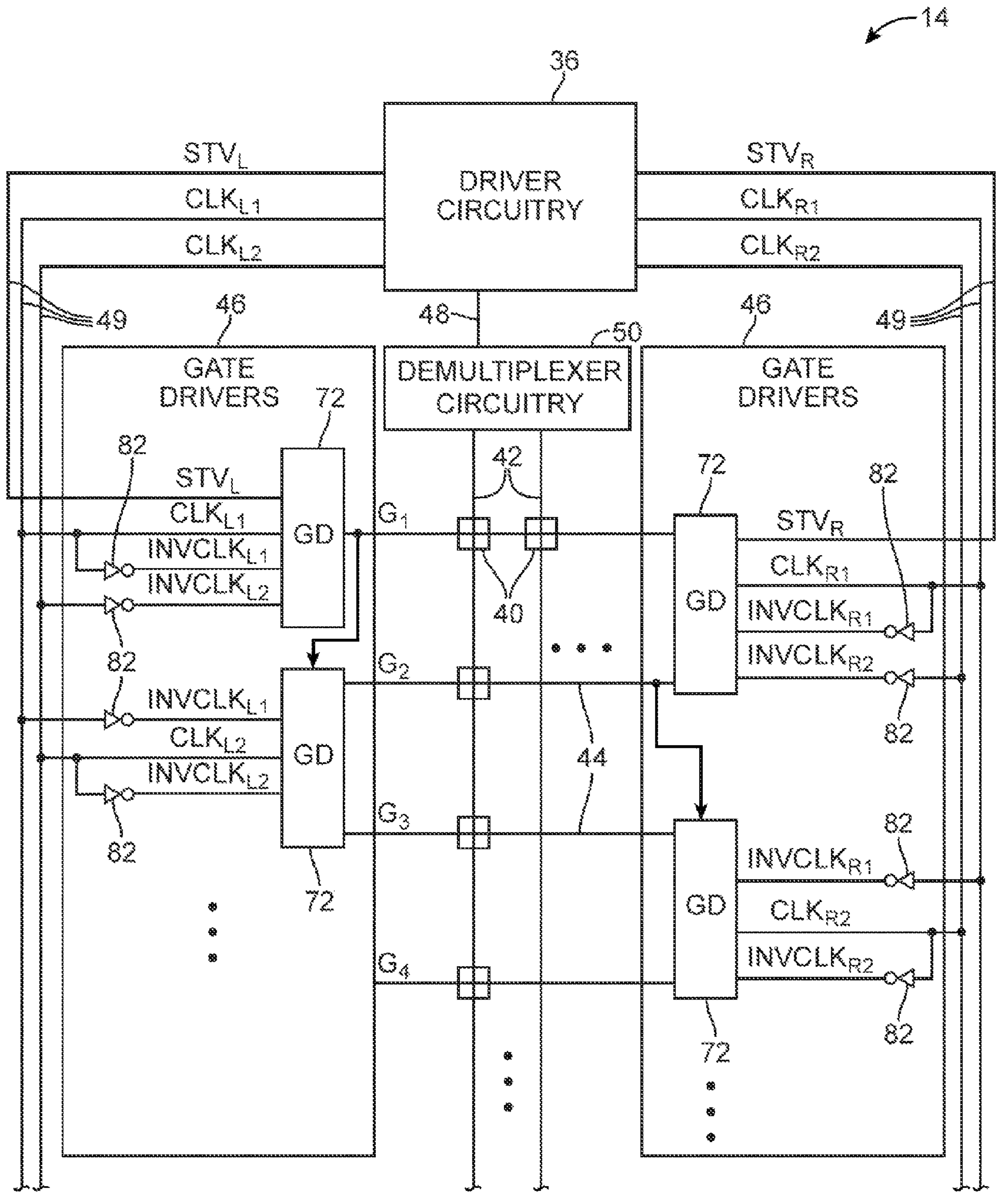
FIG. 8 is a diagram of an illustrative display including compact gate drivers having reduced interconnect routing complexity in accordance with an embodiment of the present invention.

If desired, inverted clock signals may be generated by gate driver circuitry 46 using clock signals from driver circuitry 36 as shown in FIG. 8. In the example of FIG. 8, driver circuitry 36 may produce start pulse signals STVL and STVR and clock signals CLKL1, CLKL2, CLKR1, and CLKR2. Gate driver circuitry 46 may receive the start pulse signals and clock signals over paths 49. Gate driver circuitry 46 may include inverters 82 that invert the clock signals to produce inverted clock signals INVCLKL1, INVCLKL2, etc.

The example of FIG. 8 in which a set of inverters 82 is provided for each gate driver circuit 72 is merely illustrative. If desired, gate driver circuitry 46 may be provided with a single inverter for each clock signal to be inverted. In this scenario, local interconnect routing paths may be used to convey the inverted clock signals to gate driver circuits 72 within gate driver circuitry 46.

Interconnects such as paths 49 may occupy area on display 14. The arrangement of FIG. 8 in which inverted clock signals are generated at gate driver circuitry 46 may be desirable for reducing circuit area occupied by paths 49. In scenarios such as when it is desirable to reduce the area of gate driver circuitry 46, the arrangement of FIG. 7 may be desirable (e.g., because inverting circuitry may be provided at driver circuitry 36 instead of at gate driver circuitry 46).

Figure 9:
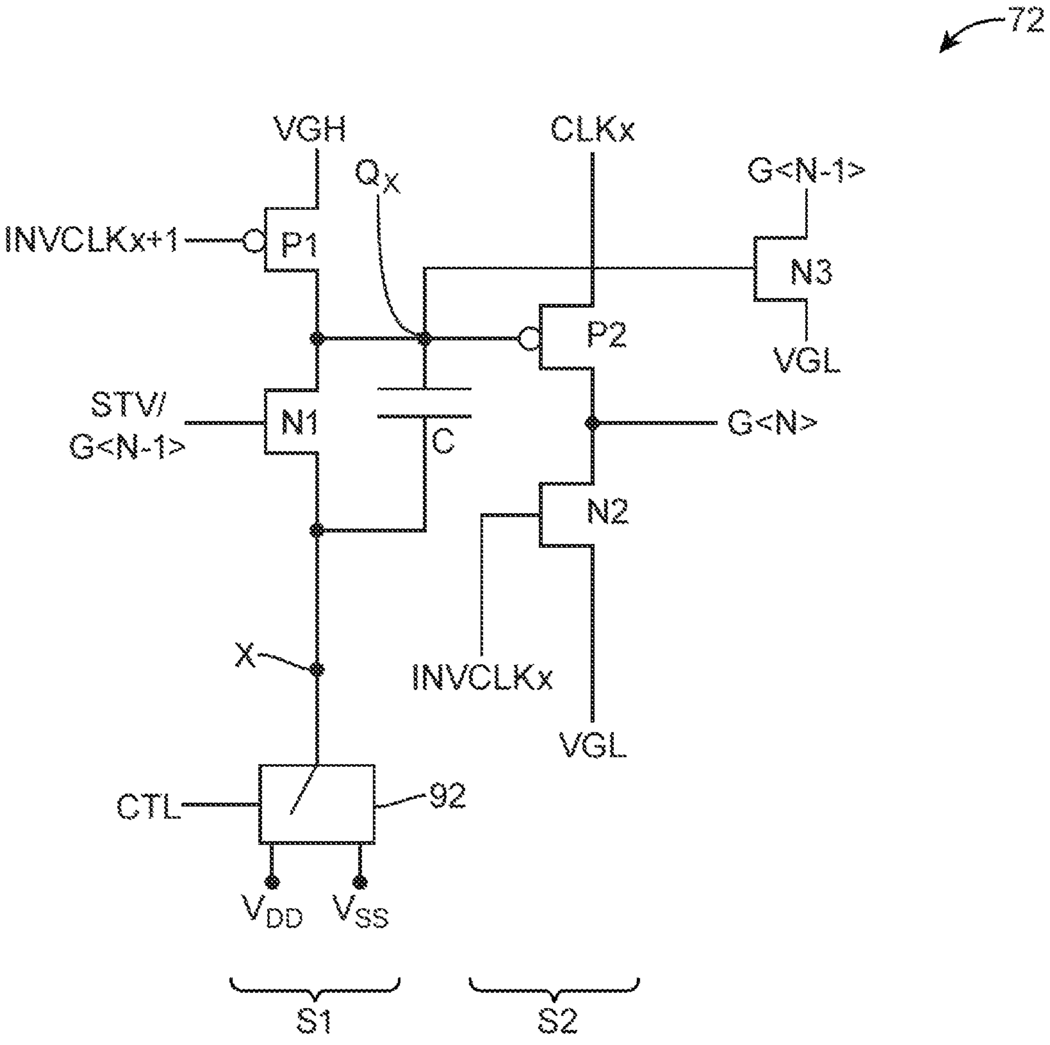
FIG. 9 is a circuit diagram of an illustrative compact gate driver in accordance with an embodiment of the present invention.

FIG. 9 is a circuit diagram of an illustrative compact gate driver 72. As shown in FIG. 9, gate driver 72 may include first and second gate driver stages S1 and S2. Gate driver stage S1 may include n-type transistor N1 and p-type transistor P1, whereas gate driver stage S2 may include n-type transistor N2 and p-type transistor P2.

Transistors P1 and N1 may be coupled in series between a bias voltage terminal and node X. A positive bias voltage VGH may be supplied at the bias voltage terminal. Node X may be selectively coupled using switching circuit 92 to a positive power supply terminal or a power supply ground terminal. Positive power supply voltage VDD may be supplied at the positive power supply terminal, whereas a power supply ground voltage VSS may be supplied at the power supply ground terminal. Switching circuit 92 may be implemented using transistor-based switches or any desired switching circuitry. When node X is coupled to the positive power supply terminal, power supply voltage VDD may be conveyed to a source/drain terminal of transistor N1. When node X is coupled to the power supply ground terminal, power supply ground voltage VSS may be conveyed to transistor N1.

Gate driver stage S2 may serve to drive a corresponding gate line G<N> with clock signal CLKx and corresponding inverted clock signal INVCLKx. Gate driver stage S1 may control when gate driver stage S2 drives gate line G<N> with clock signal CLKx. For example, gate driver stage S1 may provide a logic zero signal to the gate of transistor P2 via node Qx to enable gate driver stage S1. In this scenario, transistor P2 of gate driver stage S2 may be enabled, which passes clock signal CLKx to gate line G<N>. As another example, gate driver stage S1 may provide a logic one signal to the gate of transistor P2 to disable gate driver stage S1 (e.g., by turning off transistor P2).

Gate driver stage S1 may control gate driver stage S2 based on input signals received at the gate terminals of transistors P1 and N1. The gate terminal of transistor P1 may receive an inverted clock signal INVCLKx+1 that corresponds to a gate line subsequent to G<N>. For example, stage S1 of driver circuit 72 for gate line G1 may receive inverted clock signal INVCLKL2 that is used by a subsequent gate driver circuit to drive gate line G2. The gate terminal of transistor N1 may receive a start pulse signal that directs stage S1 to initialize gate driver operations. The start pulse signal for the first gate driver circuit 72 (i.e., the gate driver circuit 72 that drives first gate line G1) may be produced by driver circuitry 36. The start pulse signal produced by driver circuitry 36 may be referred to herein as start pulse signal STV. Each gate line signal provided by gate driver circuits 72 to gate lines (e.g., gate lines G1, G2, etc.) may be routed to a subsequent gate driver circuit 72 to serve as the start pulse signal of the subsequent gate driver circuit 72. For example, gate driver circuit 72 that drives gate line G2 may use the gate line signal on gate line G1 as a start pulse signal that initializes gate driver operations.

Capacitor C may serve to store the control signal produced by gate driver stage S1 for controlling gate driver stage S2. For example, a logic one (e.g., a voltage such as voltage VGH or VDD that is greater than a predetermined threshold) may be stored at capacitor C using transistor P1 and/or N1. In this scenario, transistors P1 and N1 may be subsequently disabled while capacitor C maintains the logic one state. Use of capacitor C1 to store control state instead of flip-flops or latches that require additional transistor circuitry may help to reduce circuit complexity of gate driver 72. Reduced circuit complexity of gate drivers 72 helps to reduce the area footprint of gate drivers 72 on display 14.

The control signal produced by first gate driver stage S1 may be provided to a gate terminal of n-type transistor N3 that is coupled between a previous gate line G<N−1> and a bias voltage terminal that supplies bias voltage VGL (e.g., a voltage corresponding to logic zero). N-type transistor N3 may help to pull the previous gate line to logic zero upon completion of gate driver operations for driver circuit 72. This may be desirable because it can be challenging for a driver circuit located at a first side of the display (e.g., driver circuit 72 located at the right side of the display that drives gate line G2) to drive a first gate line that extends across display 14. In this scenario, a subsequent driver circuit located at an opposing side of the display that drives a second gate line (e.g., driver circuit 72 located at the left side of the display that drives gate line G3) may help to pull down the first gate line upon completion of driver operations for the second gate line. Gate driver operations for each gate line are performed in succession, so gate driver operations of the first gate line (e.g., G2) may be completed before gate driver operations for the second gate line (e.g., G3).

Figure 10:
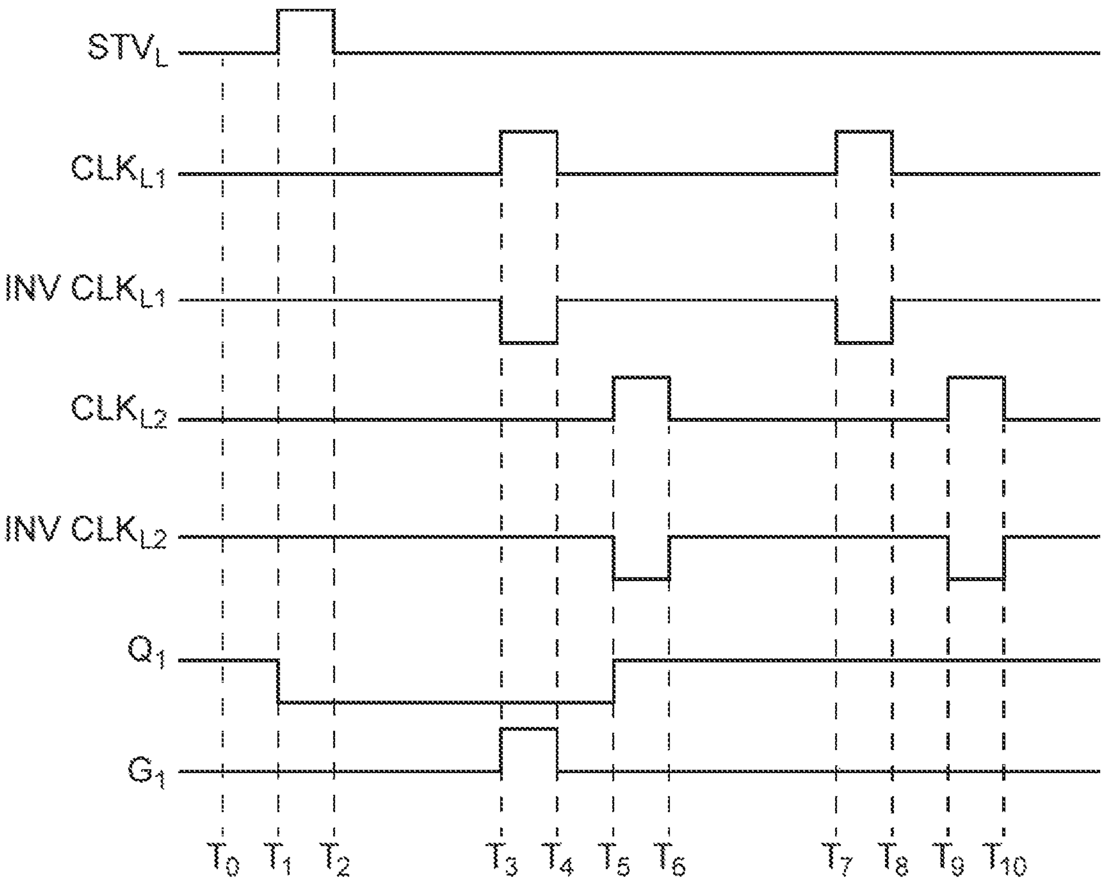
FIG. 10 is a timing diagram showing how a compact gate driver may operate to drive a gate line in accordance with an embodiment of the present invention.

FIG. 10 is a timing diagram that illustrates gate driver operations for gate driver circuit 72 that drives gate line G1. At time T0 prior to gate driver operations for gate line G1, start pulse STVL may be logic zero and inverted clock signal INVCLKL2 (e.g., INVCLKX+1) may be logic one. Transistors N1 and P1 of stage S1 may therefore be disabled at time T0. Node Q1 may have been initialized to have a logic high value so that stage S2 is disabled and drives gate line G1 with a logic zero value (e.g., because transistor N2 is activated and shorts gate line G1 to the bias voltage terminal that is provided with voltage VGL).

At time T1, start pulse signal STVL may be asserted by driver circuitry 36. The assertion of start pulse signal STVL enables transistor N1, which electrically shorts node Q1 to node X. Node X may be provided with power supply ground voltage VSS using switching circuit 92, which propagates to node Q1 and the gate of transistor P2, thereby enabling gate driver stage S2. Transistor P2 may pass clock signal CLKL1 to gate line G1 in response to being enabled.

At time T2, start pulse signal STVL may be de-asserted by driver circuitry 36, which disables transistor N1 of gate driver stage S1. The voltage at node Qx may be maintained by capacitor C to maintain the control state of driver circuit 72.

At time T3, clock signal CLKL1 may be asserted (logic one) and corresponding inverted clock signal INVCLKL1 may be de-asserted (logic zero). Transistor P2 may pass the logic one value of clock signal CLKL1 to gate line G1, whereas transistor N2 may be disabled by inverted clock signal INVCLKL1.

At time T4, clock signal CLKL1 may be de-asserted and corresponding inverted clock signal INVCLKL1 may be asserted. Transistor P2 may pass the logic zero value of clock signal CLKL1 to gate line G1. Transistor N1 may be enabled by the assertion of inverted clock signal INVCLKL1, which helps to ensure that gate line G1 is driven to logic zero (i.e., to voltage VGL).

At time T5, clock signal CLKL2 corresponding to a subsequent gate driver circuit 72 may be asserted, which also de-asserts inverted clock signal INVCLKL2. Clock signal CLKL2 may, for example, be passed to gate line G3 by a subsequent driver circuit 72 on the left side of display 14. Transistor P1 of stage S1 may be enabled by the de-assertion of inverted clock signal INVCLKL2 and subsequently pass a logic one value (e.g., voltage VGH) to node Q1. Transistor P2 may be disabled by the logic one value at node Q1, which helps to ensure that gate line G1 is driven by clock signal CLKL1 only during an active window between times T1 and T5 (e.g., while node Q1 is provided at a logic zero value).

At time T6, clock signal CLKL2 may be de-asserted and corresponding inverted clock signal INVCLKL2 may be asserted, which disables transistor P1. Capacitor C may serve to maintain the voltage at node Q1, as both transistors P1 and N1 are disabled and node Q1 is floating. Capacitor C may serve to maintain the state (logic one) of node Q1 until a subsequent cycle of gate driver operations is performed (e.g., until STVL is again asserted during a subsequent display frame).

Between times T7 and T8, clock signal CLKL1 may be asserted, because clock signal CLKL1 is a periodic signal. However, transistor P2 of stage S2 may prevent clock signal CLKL1 from propagating to gate line G1 (e.g., because transistor P2 is disabled).

Capacitors such as capacitor C may be subject to current leakage that, over time, may reduce voltage stored by the capacitors. Between times T9 and T10, inverted clock signal INVCLKL2 may be de-asserted, which enables transistor P1 to refresh the logic one value stored by capacitor C at node Q1 (e.g., transistor P1 may pass voltage VGH to node Q1, which replenishes charge that may have been lost between times T6 and T9 due to current leakage).

In some scenarios, it may be desirable to provide a layer of isolation between pull-up and pull-down portions of driving stage S2. For example, during logic transitions of clock signal CLKx and corresponding inverted clock signal INVCLKx, it may be possible for transistors P2 and N2 to be simultaneously enabled (e.g., transistor P2 may drive gate line G<N> while transistor N2 attempts to pull gate line G<N> to voltage VGL). In other words, a short circuit path may be formed from transistors P2 and N2. If logic transitions of clock signal CLKx (e.g., zero-to-one or one-to-zero) extend for excessively long time periods, an excessive amount of power may be consumed by driver stage S2 as current flows through transistor P2 and N2.

Figure 11:
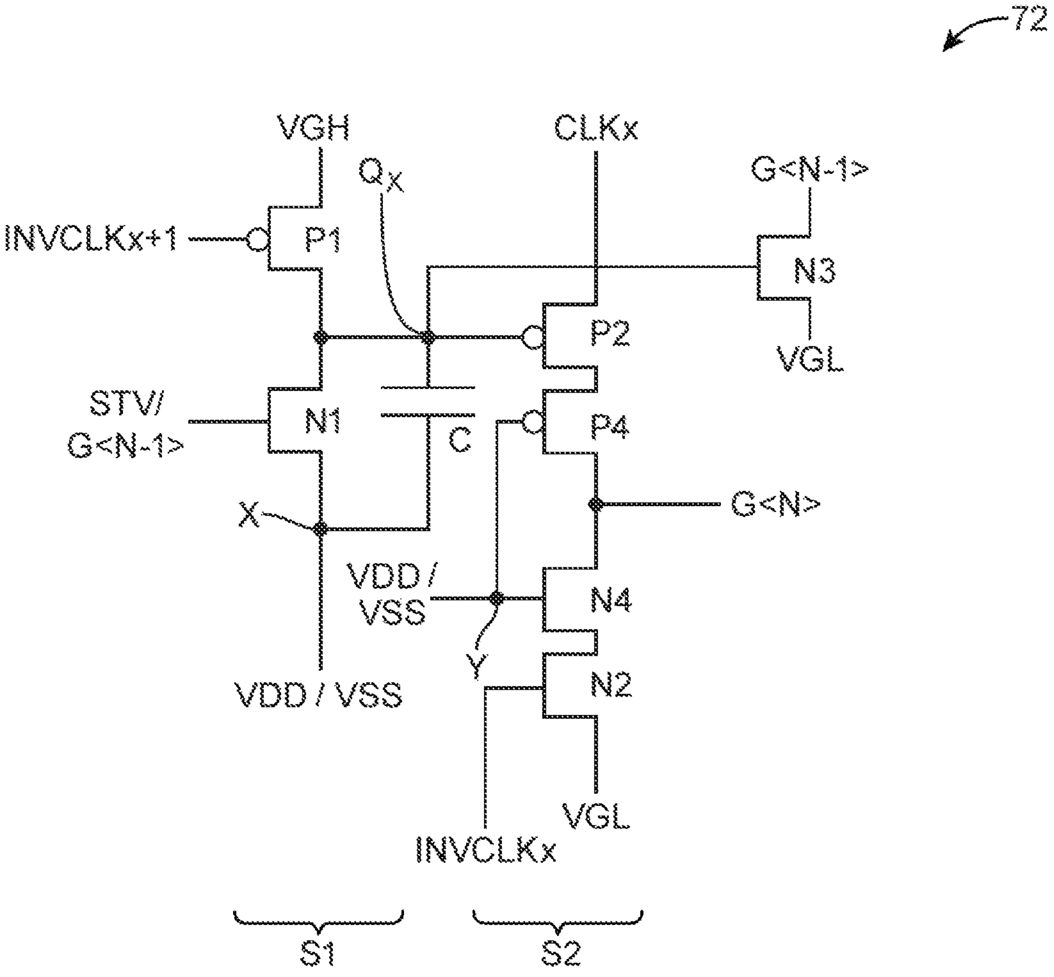
FIG. 11 is a circuit diagram of an illustrative compact gate driver with short circuit protection circuitry in accordance with an embodiment of the present invention.

FIG. 11 is an illustrative diagram of a compact gate driver 72 with protection circuitry that provides isolation between transistors P2 and N2 of gate driver stage S2. As shown in FIG. 11, protection transistors P4 and N4 may be coupled in series between transistors P2 and N2. Gate line G<N> may be coupled to an intermediate node between transistors P4 and N4. The gate terminals of transistors P4 and N4 may be coupled to a common node Y. Common node Y may be selectively coupled to a positive power supply terminal (e.g., that provides positive power supply voltage VDD) or a power supply ground terminal (e.g., that provides power supply ground voltage VSS). A switch similar to switch 92 of FIG. 9 may be used to selectively couple common node Y to the positive power supply terminal or the power supply ground terminal based on a control signal (e.g., a control signal provided by driver circuitry 36 via paths 49 or generated locally by gate driver circuitry 46).

During logic transitions of clock signal CLKx, the control voltage provided at node Y to protection transistors P4 and N4 may be determined to help prevent current shorting paths through gate driver stage S2. Node Y may be supplied with voltages VDD and VSS to follow inverted clock signal INVCLKx. For example, when INVCLKx is asserted, node Y may be supplied with a logic one (e.g., VDD), which disables transistor P4 to help prevent formation of a shorting path while enabling transistor N4 to allow transistor N2 to pull down gate line G<N> to voltage VGL. As another example, when INVCLKx is de-asserted, node Y may be supplied with a logic zero (e.g., VSS), which disables transistor N4 to help prevent shorting through transistor N2 while enabling transistor P4 to allow transistor P2 to pass clock signal CLKx to gate line G<N>.

Figure 12:
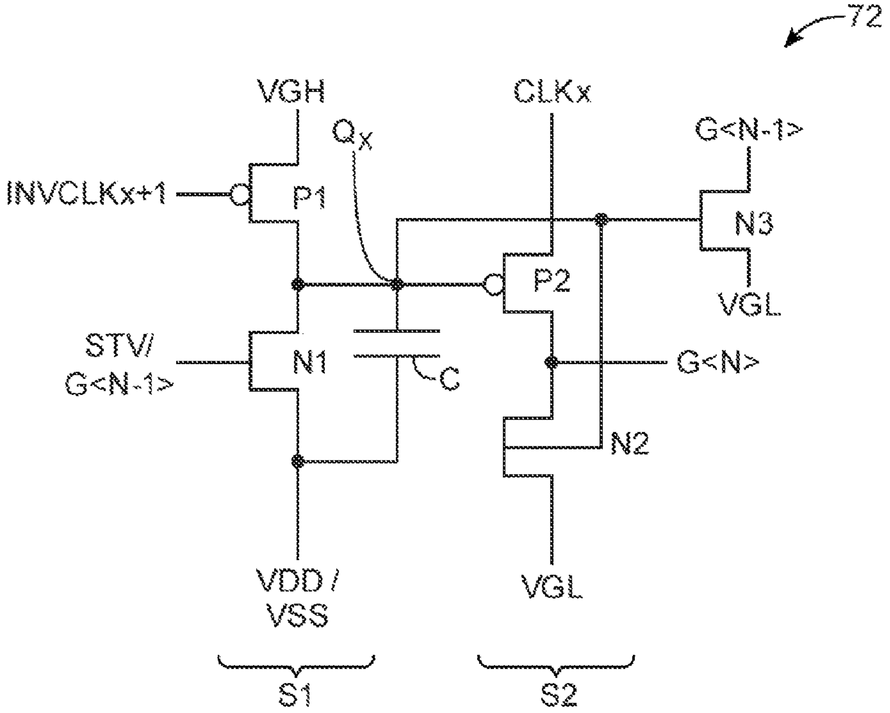
FIG. 12 is a circuit diagram of an illustrative compact gate driver with a reduced number of inputs in accordance with an embodiment of the present invention.

In some scenarios, it may be desirable to reduce the number of input signals provided to each driver circuit 72 (e.g., to reduce interconnect routing complexity). FIG. 12 is a diagram of an illustrative gate driver circuit 72 in which input signal INVCLKx may be omitted. As shown in FIG. 12, the gate of transistor N2 may be coupled to node Qx. In this arrangement, transistor P2 may serve to pass signal pulses of clock signal CLKx to gate line G<N> (e.g., during times T3-T4 of FIG. 10). When node Qx is asserted, transistor N2 may help to ensure that gate line G<N> is pulled to voltage VGL (logic zero). For example, at time T5 of FIG. 10, the de-assertion of INVCLKx+1 enables transistor P1 to pass bias voltage VGH to Q1, which enables transistor N2 to pull gate line G<N> to bias voltage VGL.

Figure 13:
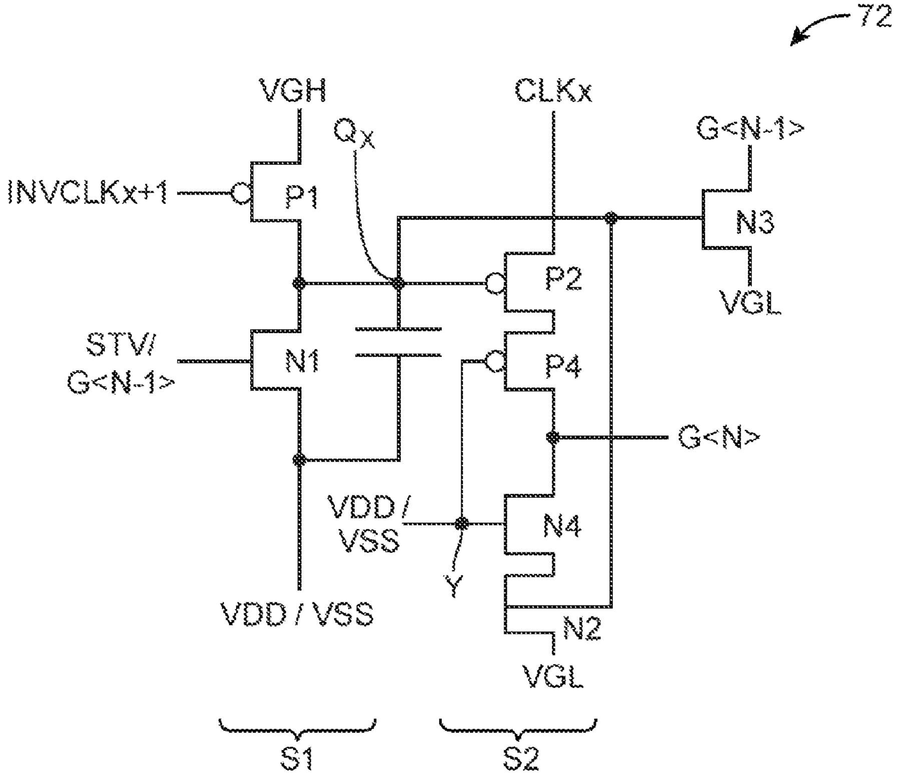
FIG. 13 is a circuit diagram of an illustrative compact gate driver with a reduced number of inputs and short circuit protection circuitry in accordance with an embodiment of the present invention.

If desired, gate driver circuits 72 may be implemented with short circuit protection circuitry and a reduced number of inputs as shown in the arrangement of FIG. 13. In the example of FIG. 13, protection transistors P4 and N4 may operate similarly to transistors P4 and N4 of FIG. 11 (e.g., node Y may be coupled to a switching circuit that controls when transistors P4 and N4 are enabled to help prevent formation of shorting paths between transistors P2 and N2). Transistor N2 may be coupled to node Qx similarly to FIG. 12.

It may be challenging for p-type transistors such as transistor P2 to pass logic zero signals. Consider the scenario in which p-type transistor P2 is enabled via a logic zero signal at the gate terminal of transistor P2. In this scenario, if CLKx is logic zero, transistor P2 may pull gate line G<N> towards logic zero. However, transistor P2 may be unable to pull gate line G<N> lower than the transistor threshold voltage of transistor P2, because transistor P2 may turn off when the voltage of gate line G<N> drops below the transistor threshold voltage.

Figure 14:
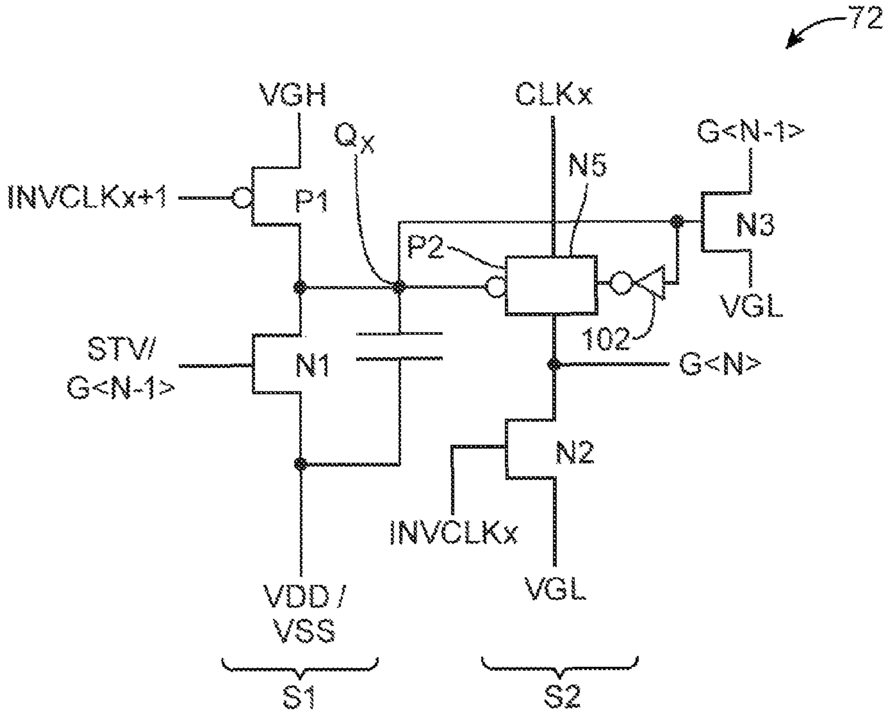
FIG. 14 is a circuit diagram of an illustrative compact gate driver with a pass gate in accordance with an embodiment of the present invention.

FIG. 14 is a circuit diagram of an illustrative compact driver circuit 72 with improved gate driving capabilities. As shown in FIG. 14, n-type transistor N5 may be coupled in parallel with p-type transistor P2 between an input terminal for clock signal CLKx and gate line G<N>. Inverter 102 may receive the control signal produced by stage S1 and provide an inverted control signal to the gate of transistor N5. During gate driving operations, N-type transistor N5 may help to pass clock signal CLKx to gate line G<N>. For example, at time T4 of FIG. 10, N-type transistor N5 may help to ensure that gate line G1 is pulled to logic zero. The combination of p-type transistor P2 and n-type transistor N5 may form a combined pass gate that may sometimes be referred to as a transmission gate. For example, in a scenario in which p-type transistors P2 and N5 are implemented using metal-oxide-semiconductor (MOS) processes, the combined pass gate is sometimes referred to as a complementary metal-oxide-semiconductor (CMOS) pass gate or a CMOS transmission gate.

Figure 15:
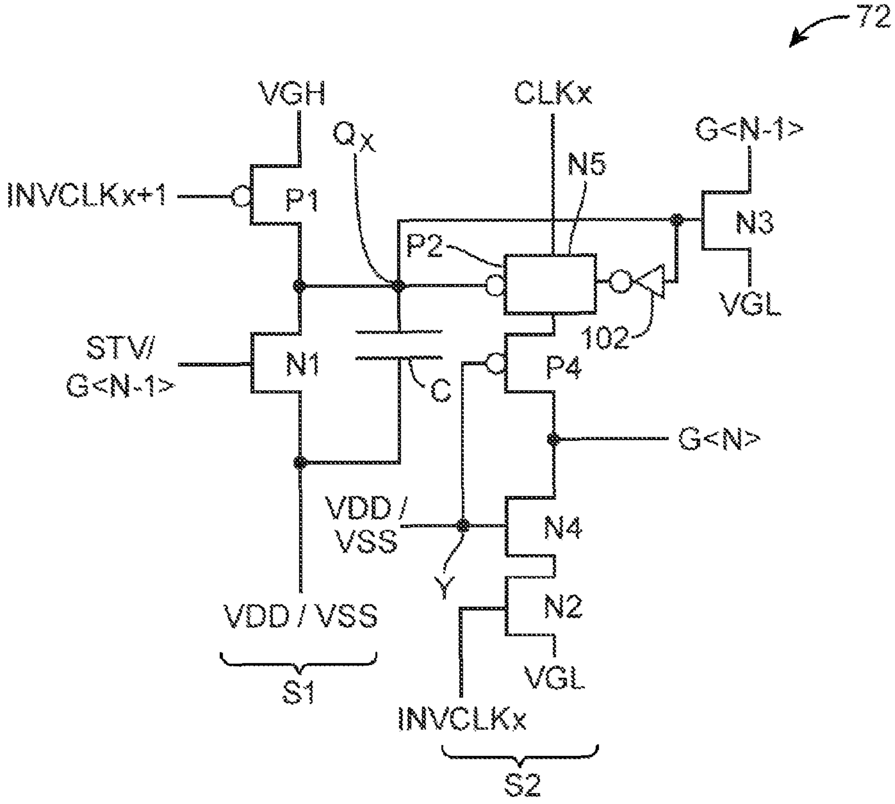
FIG. 15 is a circuit diagram of an illustrative compact gate driver with a pass gate and short circuit protection circuitry in accordance with an embodiment of the present invention.

As shown in FIG. 15, compact gate driver 72 may be provided with short circuit protection circuitry and improved gate driving capabilities. In the example of FIG. 15, a pass gate formed from transistors P2 and N5 may operate similarly to FIG. 14, whereas protection circuitry including transistors P4 and N4 may help protect against formation of short circuit paths.

Figure 16:
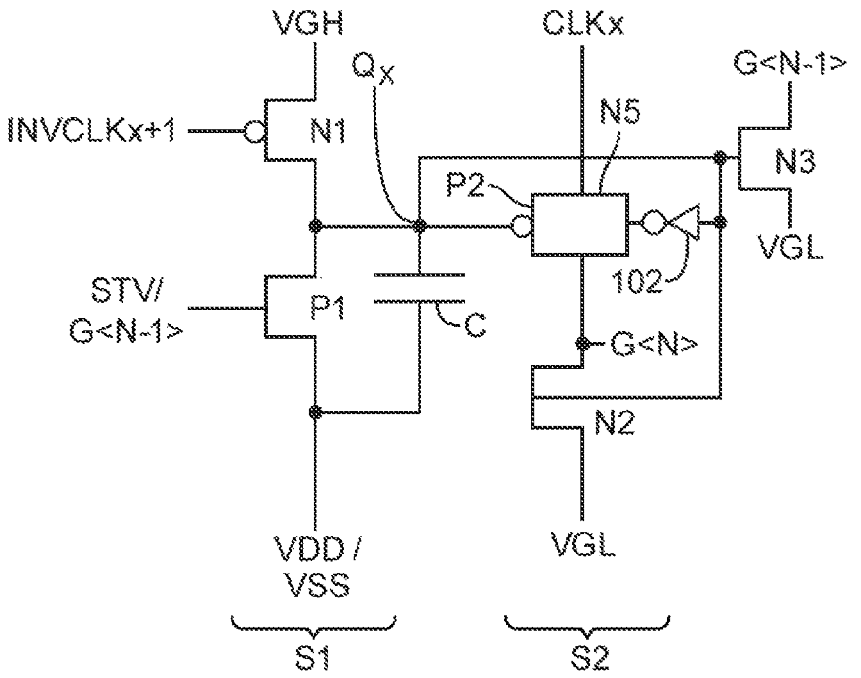
FIG. 16 is a circuit diagram of an illustrative compact gate driver with a pass gate and a reduced number of inputs in accordance with an embodiment of the present invention.

As shown in FIG. 16, compact gate driver 72 may be provided with improved gate driving capabilities and a reduced number of inputs. In the example of FIG. 16, a pass gate formed from transistors P2 and N5 may operate similarly to FIG. 14, whereas inverted clock signal INVCLKx may be omitted similarly to FIG. 12.

Figure 17:
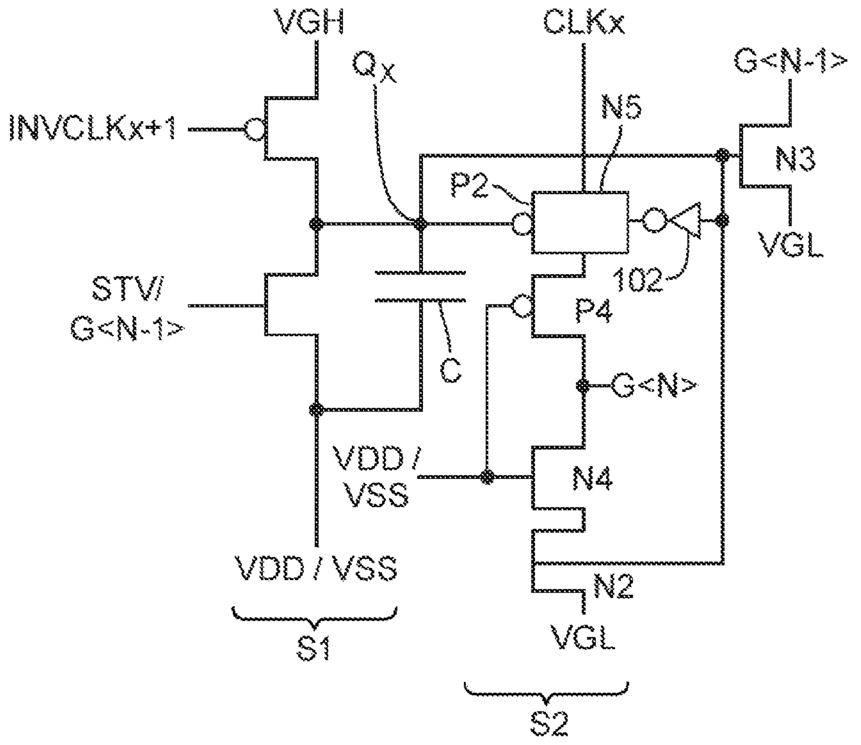
FIG. 17 is a circuit diagram of an illustrative compact gate driver with a pass gate, a reduced number of inputs, and short circuit protection circuitry in accordance with an embodiment of the present invention.

As shown in FIG. 17, compact gate driver 72 may be provided with improved gate driving capabilities, short circuit protection circuitry (e.g., similar to FIG. 14), and a reduced number of inputs (e.g., similar to FIG. 12).

Figure 18:
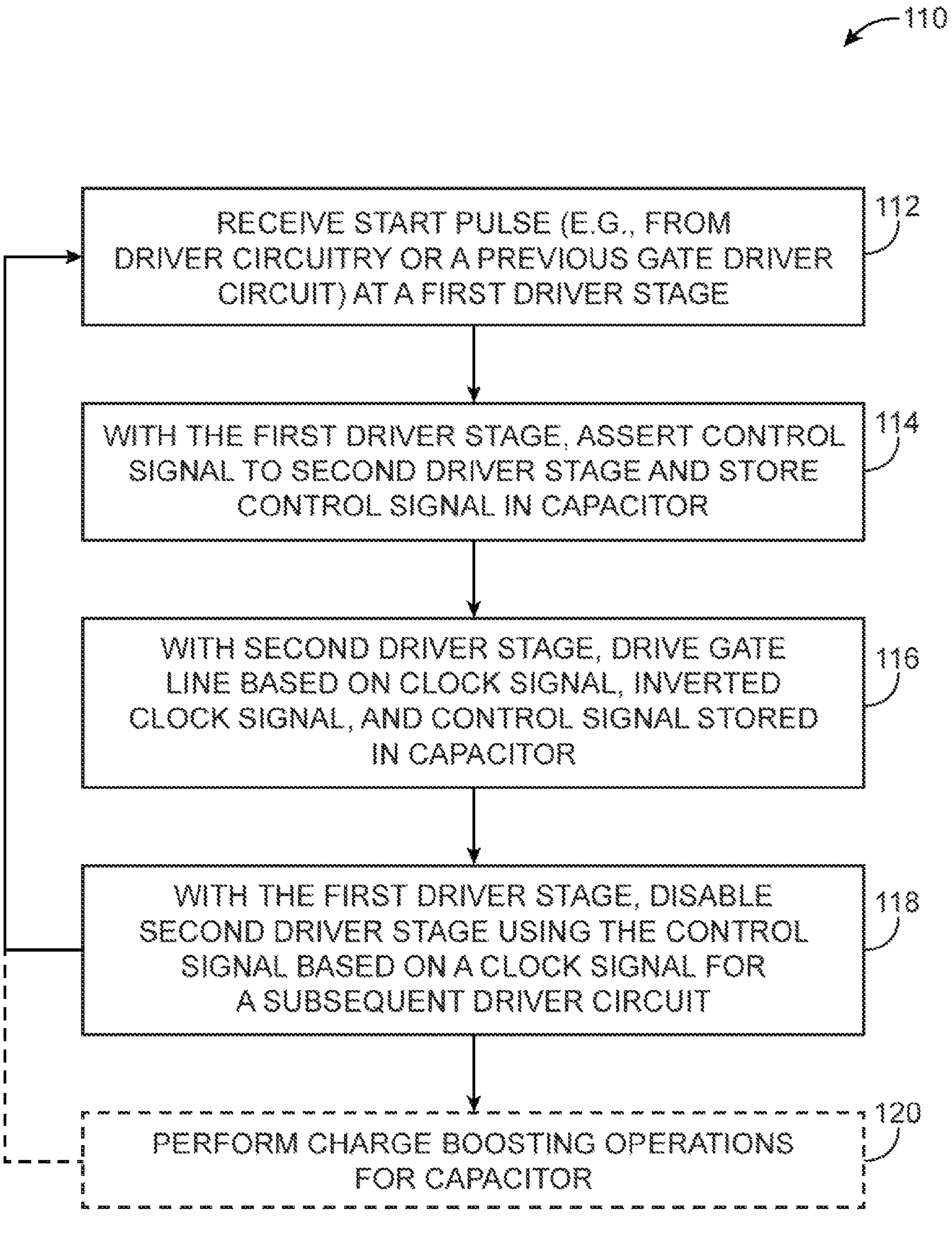
FIG. 18 is a flow chart of illustrative steps that may be performed by a compact gate driver to drive a gate line in accordance with an embodiment of the present invention.

FIG. 18 is a flow chart 110 of illustrative steps that may be performed using compact gate driver circuitry such as gate driver circuitry 72 of FIG. 9 and FIGS. 11-17. The compact gate driver circuitry may include first and second gate driver stages (e.g., first gate driver stage S1 and second gate driver stage S2 of FIG. 9).

During the operations of step 112, the gate driver circuitry may receive a start pulse. The start pulse may be received from central driver circuitry (e.g., for a gate driver circuit 72 that drives first gate line G1) or may be received from a previous gate driver circuit. The start pulse may direct the first gate driver stage to initialize gate driver operations.

During the operations of step 114, the first gate driver stage may assert a control signal to the second gate driver stage. The control signal may direct the second gate driver stage to initialize gate driver operations. The first gate driver stage may store the control signal in a capacitor (or at a node associated with parasitic capacitance that serves to store charge). For example, first gate driver stage S1 of FIG. 9 may store a logic one at node Qx. The capacitor may serve to maintain the control state of gate driver stages S1 and S2.

During the operations of step 116, the second driver stage may drive a corresponding gate line based on a clock signal, an inverted clock signal corresponding to the clock signal, and the control signal provided by the first gate driver stage. For example, gate driver stage S2 of FIG. 9 may be enabled by the control signal provided at node Qx to drive gate line G<N> using clock signal CLKx and corresponding inverted clock signal INVCLKx.

If desired, the inverted clock signal corresponding to the clock signal may be omitted to reduce how many inputs are required to implement the gate driver. For example, the gate driver may be implemented using the arrangements of FIG. 12, FIG. 13, FIG. 16, and FIG. 17 in which inverted clock signal INVCLKx is omitted. If desired, the second driver stage may include protection circuitry that helps to prevent formation of short circuit paths during gate driver operations in step 116.

The first driver stage may receive a clock signal for a subsequent driver circuit. During the operations of step 118, the first driver stage may disable the second driver stage based on the clock signal for the subsequent driver circuit. For example, first driver stage S1 may receive inverted clock signal INVCLKx+1 that is used by a subsequent driver circuit to drive a subsequent gate line. In this scenario, first driver stage S1 may disable second driver stage S2 based on inverted clock signal INVCLKx+1 (e.g., in response to de-assertion of signal INVCLKx+1). The process may subsequently return to step 112 to perform additional gate driver operations or, if desired, may proceed to optional step 120.

During optional step 120, the gate driver circuit may perform charge boosting operations for the capacitor to help ensure that the second gate driver stage is fully disabled when not performing gate driver operations. Driver circuitry 36 (see, e.g., FIG. 5) may control the charge boosting operations using control signal CTL that is provided to switching circuit 92. For example, after completion of gate driver operations for a gate line (e.g., at time T5 of FIG. 10), voltage VGH may be stored at node Qx (e.g., node Q1). Subsequently, transistors N1 and P1 may each be disabled, which isolates node Qx from active power sources (i.e., node Qx is a floating node). Driver circuitry 36 may then use control signal CTL to direct switching circuit 92 to couple a positive power supply terminal to node X, which boosts the voltage at node Qx to the sum of positive power supply voltage VDD and voltage VGH stored in capacitor C. The boosted voltage at node Qx may help ensure that p-type transistor P2 is disabled. The process may then return to step 112 to perform additional gate driver operations.

The example of FIG. 18 in which charge boosting operations are performed subsequent to gate driver operations of steps 112-118 is merely illustrative. If desired, charge boosting operations may be performed at any desired time while the gate driver circuit is not performing gate driver operations to help ensure that the second gate driver stage is disabled.

The example of FIG. 8 in which compact drivers 72 are implemented in a display is merely illustrative. If desired, compact drivers 72 may be used in any desired arrangement to drive sequential row accesses. For example, compact drivers 72 may be implemented in image sensors having image pixels that are arranged in a grid of rows and columns. As another example, compact drivers 72 may be used to drive sequential row accesses in a scanner (e.g., an image scanner).

The foregoing is merely illustrative of the principles of this invention and various modifications can be made by those skilled in the art without departing from the scope and spirit of the invention.

What is claimed is:

1. Circuitry, comprising:

a first driver stage that receives a start pulse signal and produces a control signal and that comprises a first transistor and a second transistor coupled in series between first and second bias voltage terminals, wherein the first transistor receives the start pulse signal at a gate terminal;

a second driver stage that receives the control signal, a periodic signal, and a corresponding inverted periodic signal, wherein the second driver stage drives a gate line with the periodic signal based on the control signal and the inverted periodic signal; and a switching circuit coupled to the second bias voltage terminal, wherein the switching circuit is operable in a first configuration in which the second bias voltage terminal is coupled to a positive power supply terminal and a second configuration in which the second bias voltage terminal is coupled to a power supply ground terminal.

2. The circuitry defined in claim 1 wherein the gate line is coupled to a plurality of pixels in a display.

3. The circuitry defined in claim 1 wherein the first and second transistors comprise an n-type transistor and a p-type transistor, respectively.

4. The circuitry defined in claim 3 wherein a capacitor is coupled in parallel with the n-type transistor between a control node at which the control signal is provided to the second driver stage and the second bias voltage terminal and wherein the capacitor is operable to store the control signal for the second driver stage.

5. The circuitry defined in claim 3 wherein the n-type transistor comprises a first n-type transistor, wherein the p-type transistor comprises a first p-type transistor, wherein the second driver stage comprises a second p-type transistor and a second n-type transistor coupled in series between an input terminal and a third bias voltage terminal, wherein the input terminal receives the periodic signal, and wherein the second p-type transistor receives the control signal from the first driver stage.

6. The circuitry defined in claim 5 wherein the periodic signal and corresponding inverted periodic signal comprises a clock signal and a corresponding inverted clock signal.

7. The circuitry defined in claim 5 wherein the second driver stage further comprises a third p-type transistor and a third n-type transistor coupled in series between the second p-type transistor and the second n-type transistor, wherein third p-type and n-type transistors are configured to prevent formation of short circuit paths between the second p-type and n-type transistors.

8. The circuitry defined in claim 5 wherein the second n-type transistor receives the inverted periodic signal at a gate terminal.

9. The circuitry defined in claim 5 wherein the second driver stage further comprises:

a third n-type transistor coupled in parallel with the second p-type transistor; and an inverter that receives the control signal from the first driver stage and provides an inverted control signal to a gate terminal of the third n-type transistor.

10. The circuitry defined in claim 5 wherein the circuitry is coupled to additional circuitry that drives an additional gate line based on an additional periodic signal, the circuitry further comprising:

a third n-type transistor coupled between the additional gate line and the third voltage bias terminal, wherein the third n-type transistor includes a gate terminal that receives the control signal from the first driver stage.

11. The circuitry defined in claim 5 wherein the circuitry is coupled to additional circuitry that drives an additional gate line based on an additional periodic signal and wherein the first p-type transistor includes a gate terminal that receives the additional periodic signal.

12. Circuitry operable to drive a first gate line in a display, the circuitry comprising:

a first gate driver stage that determines a control state;

a capacitor operable to store the control state;

a second gate driver stage that drives the gate line based on the control state; and a transistor coupled between a second gate line in the display and a bias terminal, wherein the transistor includes a gate terminal that receives the control state from the capacitor.

13. The circuitry defined in claim 12 wherein the second gate driver stage comprises pass transistor circuitry that passes a clock signal to the gate line based on the control state.

14. The circuitry defined in claim 13 wherein the pass transistor circuitry comprises a pass gate.

15. The circuitry defined in claim 13 wherein the second gate driver stage further comprises short circuit protection circuitry that is coupled to the pass transistor circuitry.

16. The circuitry defined in claim 13 wherein the second gate driver stage comprises first and second transistors coupled in series between an input terminal and a bias voltage terminal, wherein the input terminal receives the clock signal, wherein the first and second transistors are controlled by the stored control state, and wherein the gate line is coupled to an intermediate node between the first and second transistors.

17. The circuitry defined in claim 12 wherein the first driver stage, the capacitor, and the second gate driver stage form a first driver circuit, wherein the first driver circuit performs gate driver operations based on a first clock signal, wherein the circuitry includes a second driver circuit operable to drive a third gate line based on a second clock signal, and wherein the first driver stage determines the control state based at least partly on the second clock signal.

18. A method of operating gate driver circuitry for a display, the method comprising:

with a first gate driver stage, producing a control signal;

with a capacitor, storing the control signal;

with a second gate driver stage, driving a first gate line of the display based on the control signal stored by the capacitor; and with a transistor coupled between a second gate line of the display and a bias terminal, receiving the control signal from the capacitor via a gate terminal of the transistor.

19. The method defined in claim 18 further comprising:

with the first gate driver stage, receiving a start pulse, wherein producing the control signal comprises producing the control signal based on the start pulse.

20. The method defined in claim 19 further comprising:

with the second driver stage, receiving a clock signal and a corresponding inverted clock signal that are associated with the gate line; and with the second driver stage, driving the gate line based on the control signal, the clock signal, and the inverted clock signal.

21. The method defined in claim 20 wherein the display includes additional gate driver circuitry that drives a third gate line with an additional clock signal and wherein producing the control signal comprises:

producing the control signal based on the additional clock signal.

22. The method defined in claim 21 wherein the control signal is provided at a voltage further comprising:

with the first driver stage, performing charge boosting operations that boost the voltage of the control signal.

* * * * *